US006651182B1

United States Patent
Chang et al.

(12) United States Patent
(10) Patent No.: US 6,651,182 B1
(45) Date of Patent: Nov. 18, 2003

(54) METHOD FOR OPTIMAL SYSTEM AVAILABILITY VIA RESOURCE RECOVERY

(75) Inventors: John Kwangil Chang, Austin, TX (US); Alongkorn Kitamorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 09/631,721

(22) Filed: Aug. 3, 2000

(51) Int. Cl.[7] ............................................... G06F 11/00
(52) U.S. Cl. ............................................ 714/3; 714/10
(58) Field of Search ............................. 714/43, 44, 10, 714/14, 47, 3; 712/10–22; 709/104, 226, 229

(56) References Cited

U.S. PATENT DOCUMENTS 6,073,248 A * 6/2000 Doshi et al. ................... 714/4
6,311,290 B1 * 10/2001 Hasbun et al. ................ 714/15
6,345,369 B1 * 2/2002 Kitamorn et al. ............. 714/14
6,460,005 B1 * 10/2002 Chang ........................ 702/132
2002/0108077 A1 * 8/2002 Havekost et al. ............. 714/47

* cited by examiner

Primary Examiner—Nadeem Iqbal
Assistant Examiner—Timothy M. Bonura
(74) Attorney, Agent, or Firm—Duke W. Yee; Mark E. McBurney; Stephen K. Loe

(57) ABSTRACT

A method, system, and apparatus for recovering system resources to provide a minimum system configuration in a data processing system is provided. In one embodiment, a firmware component within the data processing system, during initial program load, determines that a first resource has failed. The first resource is then deallocated. Responsive to a determination that deallocation of the resource has resulted in less than the minimum system configuration for operation of a data processing system, the firmware component determines which of a plurality of deallocated resources suffered from the least severe failure. The one of the plurality of deallocated resources that suffered from the least severe failure is then reallocated for use by the data processing system.

18 Claims, 6 Drawing Sheets

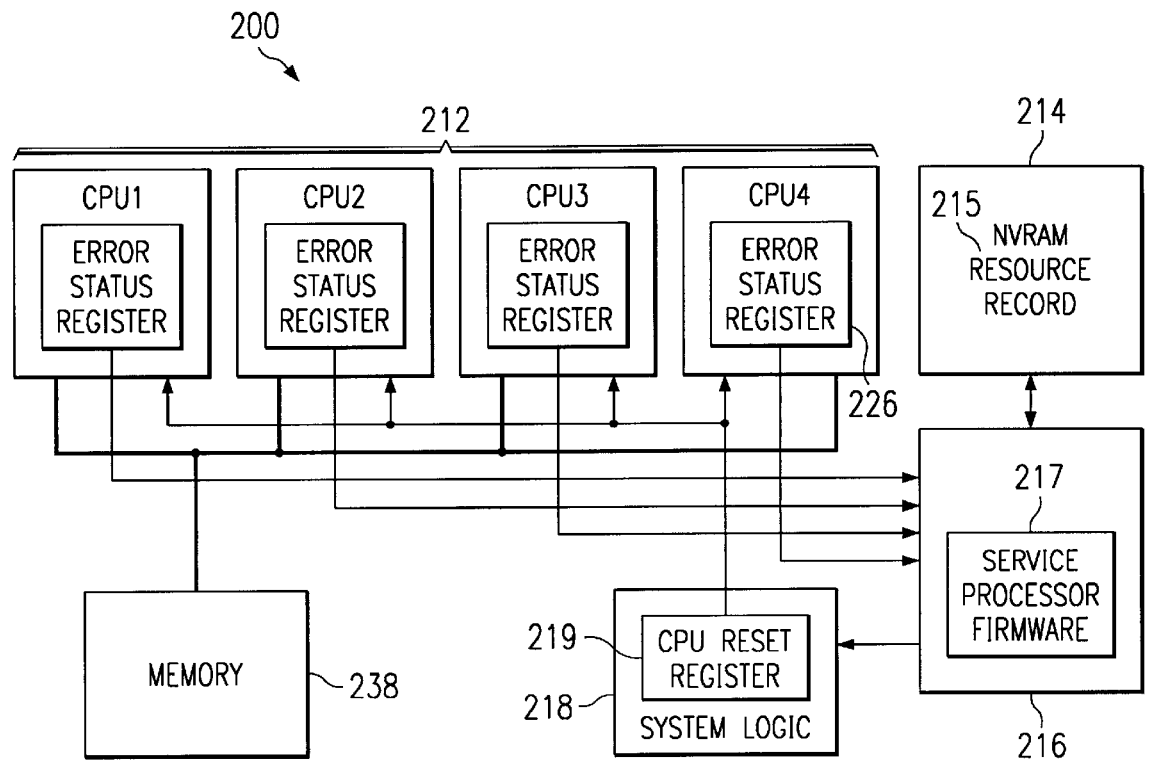

FIG. 2

| BYTE | DESCRIPTION |
|---|---|
| 0-1 | RL: RECORD LENGTH PER CPU DECONFIGURABLE UNIT |
| 2 | N: MAXIMUM NUMBER OF DECONFIGURABLE UNITS IN THE SYSTEM WHEN FULLY CONFIGURED |
| 3-7 | L2 SIZE FROM CPU CARD VPD ZC-L2 FIELD |
| 8-10 | CPU FRU VERSION FROM CPU CARD VPD ZC-PF FIELD. THIS INFORMATION IS ALSO USED FOR THE XXX VALUE OF CPU 8-DIGIT ERROR CODE |
| 11-20 | PROCESSOR SPEED FROM CPU CARD VPD ZC-PS FIELD |
| 21-30 | SYSTEM BUS SPEED FROM CPU CARD VPD ZC-SB FIELD |
| 31-31+ (N*RL) | SPECIFIC CPU RECORD DATA. THE REMAINING FIELDS OF THE CPU RECORD CONSISTS OF N* RL-BYTE SUBRECORDS, ONE FOR EACH POSSIBLE CPU (N IS THE VALUE IN BYTES 2) |

| BYTE | BIT | DESCRIPTION |
|---|---|---|
| 0 | | PHYSICAL CPU NUMBER, AS DEFINED IN THE OF DEVICE TREE AND ERROR LOG ENTRY (OpenPic INTERRUPT) |
| 1 | | HARDWIRED CPU ID (PIR OR EAR) |
| 2 | 0 MSB | UPDATE STATUS FOR BYTE 3:<br>0 = BYTE 3 IN THIS RECORD IS CONSISTENT WITH CPU VDP ZC-ER FIELD<br>1 = BYTE 3 IN THIS RECORD HAS BEEN UPDATED BY EITHER SYSTEM OR SERVICE PROCESSOR FIRMWARE |
| | 1-3 | RESERVED |
| | 4-7 | PRESENT AND CURRENT CONFIGURATION STATUS OF THIS CPU:<br>0X0 NOT PRESENT<br>0X1 PRESENT AND CONFIGURED BY SYSTEM<br>0X2 PRESENT, DECONFIGURED BY SYSTEM (FAILURE CRITERIA MET)<br>0X3 PRESENT AND MANUALLY CONFIGURED (REGARDLESS OF RUNTIME FAILURE CRITERIA)<br>0X4 PRESENT AND MANUALLY DECONFIGURED (REGARDLESS OF RUNTIME FAILURE CRITERIA) |
| 3 | | FAIL STATUS (THIS FIELD ALSO USED FOR THE RR VALUE IN THE CPU 8-DIGIT ERROR CODE)<br>0X00 NO FAILURE<br>0X1R BIST FAILURE<br>0X2R POST FAILURE<br>0X3n RUN-TIME NON-RECOVERABLE MACHINE CHECK ERROR<br>0X4n RUN-TIME NON-RECOVERABLE CHECKSTOP ERROR<br>0X5n RUN-TIME RECOVERABLE ERROR THRESHOLD EXCEEDED (CPU INTERNAL ERRORS)<br>0X6n RUN-TIME RECOVERABLE ERROR THRESHOLD EXCEEDED (L2 SINGLE BIT ECC)<br>NOTE: n = NUMBER OF FAILURES OR THRESHOLDS EXCEEDED<br>R = ADDITIONAL REASON CODES FOR BIST OR POST FAILURES |
| 4-13 | | 10-BYTE VALUE CONTAINING THE CPU VPD SERIAL NUMBER (SN) |
| 14-(14+y) | | y-BYTE VALUE CONTAINING THE CPU FRU PHYSICAL/HARDWARE LOCATION CODE (IN ASCII FORM)<br>NOTE: THE y VALUE IS PLATFORM DEPENDENT. FOR SPHINX, y = 5 |

| BYTE | DESCRIPTION |
|---|---|
| 0-1 | RL: RECORD LENGTH PER MEMORY FRU (DIMM/CARD) |
| 2 | N: MAXIMUM NUMBER OF MEMORY FRUs (DIMM/CARD) IN THE SYSTEM WHEN FULLY CONFIGURED |
| 3-3+ (N*RL) | SPECIFIC MEMORY RECORD DATA. THE REMAINING FIELDS OF THE MEMORY RECORD CONSISTS OF N* RL-BYTE SUBRECORDS, ONE FOR EACH POSSIBLE MEMORY UNIT (N IS THE VALUE IN BYTES 2) |

| BYTE | BIT | DESCRIPTION |
|---|---|---|
| 0 | | MEMORY CARD SLOT NUMBER OR ID |
| 1 | | DIMM SLOT NUMBER OR ID ON MEMORY CARD |
| 2 | 0 MSB | UPDATE STATUS FOR BYTE 3:<br>0 = BYTE 3 IN THIS RECORD IS CONSISTENT WITH MEMORY VPD ZM-ER FIELD<br>1 = BYTE 3 IN THIS RECORD HAS BEEN UPDATED BY EITHER SYSTEM OR SERVICE PROCESSOR FIRMWARE |
| | 1-3 | RESERVED |
| | 4-7 | PRESENT AND CURRENT CONFIGURATION STATUS OF THIS CPU:<br>0X0 NOT PRESENT<br>0X1 PRESENT AND CONFIGURED BY SYSTEM<br>0X2 PRESENT, DECONFIGURED BY SYSTEM (FAILURE CRITERIA MET)<br>0X3 PRESENT AND MANUALLY CONFIGURED (REGARDLESS OF RUNTIME FAILURE CRITERIA)<br>0X4 PRESENT AND MANUALLY DECONFIGURED (REGARDLESS OF RUNTIME FAILURE CRITERIA) |
| 3 | | FAIL STATUS (THIS FIELD ALSO USED FOR THE RR VALUE IN THE CPU 8-DIGIT ERROR CODE)<br>0X00 NO FAILURE<br>0X2R POST FAILURE<br>0X3n RUN-TIME UNRECOVERABLE ERROR, ISOLATE TO THIS UNIT<br>0X4n RUN-TIME UNRECOVERABLE ERROR, ISOLATE TO A BANK OF MEMORY CONTAINING THIS UNIT<br>0X5n RUN-TIME RECOVERABLE ERROR THRESHOLD EXCEEDED (SINGLE BIT ECC ERRORS)<br><br>NOTE:  n = NUMBER OF FAILURES OR THRESHOLDS EXCEEDED<br>R = ADDITIONAL REASON CODES FOR POST FAILURES |
| 4-7 | | 4-BYTE CONTAINING THE VALUE FROM JEDEC SPD ASSEMBLY SERIAL NUMBER BYTE 95-98 |
| 8-(8+y) | | y-BYTE VALUE CONTAINING THE MEMORY DIMM PHYSICAL/HARDWARE LOCATION CODE (IN ASCII FORM)<br>NOTE: THE y VALUE IS PLATFORM DEPENDENT. FOR SPHINX, y = 8 |

FIG. 5B

METHOD FOR OPTIMAL SYSTEM AVAILABILITY VIA RESOURCE RECOVERY

CROSS REFERENCE TO RELATED APPLICATIONS

The present application is related to U.S. Pat. No. 6,408,362 entitled "METHOD AND SYSTEM FOR BOOT-TIME DECONFIGURATION OF A MEMORY IN A PROCESSING SYSTEM" issued on Jun. 18, 2002, to U.S. Pat. No. 6,233,680 entitled "METHOD AND SYSTEM FOR BOOT-TIME DECONFIGURATION OF A PROCESSOR IN A SYMMETRICAL MULTI-PROCESSING SYSTEM" issued on May 15, 2001, and to U.S. patent application Ser. No. 09/464,842 entitled "METHOD AND SYSTEM FOR OPTIMIZING REMOTE PROCEDURE CALLS" filed Dec. 16, 1999. The content of the above mentioned commonly assigned, U.S. patent applications are hereby incorporated herein by reference for all purposes.

BACKGROUND OF THE INVENTION

1. Technical Field

The present invention relates generally to data processing systems and more particularly to providing an optimal minimum system configuration for the data processing system at boot-time.

2. Description of Related Art

Data processing systems oftentimes experience hardware failures. Some data processing Systems, such as the RS/6000, a product of the International Business hardware failures. Some data processing systems, such as the RS/6000, a product of the International Business Machines Corporation of Armonk, N.Y., offer features to predict hardware failures based on the previous failure history of a particular piece of hardware and the ability to deconfigure or deallocate such resource, be it a processor or memory device. In the RS/6000, these capabilities are provided by the Memory Repeat Gard and CPU Repeat Gard features. Thus, if one knows that a particular resource is bound for failure, it can be kept from being utilized in the first place. By keeping these bad hardware resources from being configured and used within the data processing system, a higher availability of the system can be achieved.

However, a system can experience excessive hardware failures, either catastrophically or gradually over time, to the point that it has less than the minimum hardware configuration required to boot the system. In order to prevent this undesirable situation, on some platforms, the last hardware resource to fail could not be deconfigured. When this last resource is kept from being deallocated, it may not provide the optimal availability of the system. Thus, when this last resource does in fact suffer a failure, it is not allowed to be deconfigured. Therefore, the system must try to run on that resource and that resource only, if at all possible. However, there could be other resources that had been deconfigured earlier that suffered less severe errors and, therefor, would be better candidates on which to run the system. Therefore, a method, system, and apparatus for providing a more optimal availability of system resources when a system resource required for the minimum configuration to boot the system fails would be desirable.

SUMMARY OF THE INVENTION

The present invention provides a method, system, and apparatus for recovering system resources to provide a minimum system configuration in a data processing system. In one embodiment, a firmware component within the data processing system, during initial program load, determines that a first resource has failed. The first resource is then deallocated. Responsive to a determination that deallocation of the resource has resulted in less than the minimum system configuration for operation of a data processing system, the firmware component determines which of a plurality of deallocated resources suffered from the least severe failure. The one of the plurality of deallocated resources that suffered from the least severe failure is then reallocated for use by the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a block diagram of a symmetric multi-processor (SMP) data processing system 200 in which CPUs may be deallocated in accordance with the present invention;

FIG. 3A depicts an example of the CPU General Record Format in accordance with the present invention;

FIG. 3B depicts an example of the CPU Specific Record Format in accordance with the present invention;

FIG. 5B depicts an example of the Memory Specific Record Format in accordance with the present invention;

DETAILED DESCRIPTION OF THE PREFERRED EMBODIMENT

Figure 1:
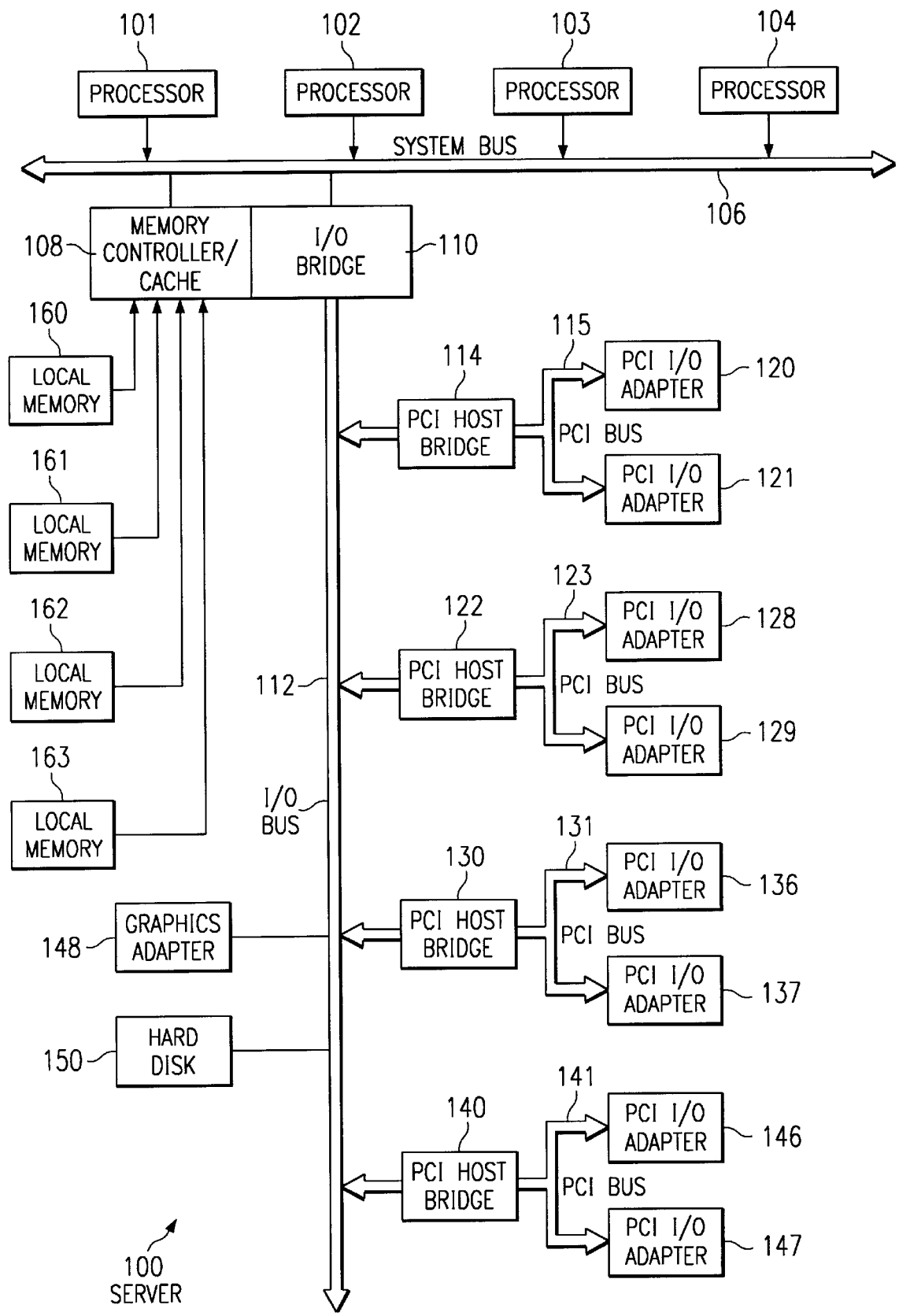
FIG. 1 depicts a block diagram of a data processing system in accordance with the present

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors) Each I/O Adapter 120–121 provides an interface between data processing system 100 and input/output devices such as, for example, other network computers, which are clients to data processing system 100.

Additional PCI host bridges 122, 130, and 140 provide interfaces for additional PCI buses 123, 131, and 141. Each of additional POT buses 123, 131, and 141 are connected to a plurality of POT I/O adapters 128–129, 136–137, and 146–147. Thus, additional I/O devices, such as, for example, modems or network adapters may be supported through each of POT I/O adapters 128–129, 136–137, and 146–147. In this manner, data processing system 100 allows connections to multiple network computers.

A memory mapped graphics adapter 148 and hard disk 150 may also be connected to I/O bus 112 as depicted, either directly or indirectly. Hard disk 150 may be logically partitioned between various partitions without the need for additional hard disks. However, additional hard disks may be utilized if desired.

Those of ordinary skill in the art will appreciate that the hardware depicted in FIG. 1 may vary. For example, other peripheral devices, such as optical disk drives and the like, also may be used in addition to or in place of the hardware depicted. Furthermore, the present invention is not limited to implementation on a multi-processor system, but may also be implemented on other types of data processing systems. The depicted example is not meant to imply architectural limitations with respect to the present invention.

FIG. 2 is a block diagram of a symmetric multi-processor (SMP) data processing system 200 in which CPUs may be deallocated in accordance with the present invention. Data processing system 200 may be implemented, for example, as data processing system 100 in FIG. 1. As is seen, data processing system 200 includes multiple CPUs 212 and memory 238. The CPUs 212 are in communication with a nonvolatile device such as a nonvolatile random access memory (NVRAM) 214 which contains pertinent system information. The service processor 216 includes service processor firmware 217 and is in communication with NVRAM 214 to provide information thereto. When one of the CPUs 212 in the system 200 has soft errors that are affecting the operation of the processing system 200, it is possible that the processing system 200 could operate effectively even if one of the CPUs 212 is shut down. Accordingly, the present invention allows for the processing system 200 to resume while deconfiguring the CPU that is causing the repeatable soft errors.

Accordingly, through the present invention, CPU errors are detected during normal computer operations by error detection logic. This detection is utilized during any subsequent boot process by service processor firmware 217 to deallocate the defective CPU. This is accomplished through the use of error status within each CPU and system logic, and through the use of a resource record area in the nonvolatile device, which provide information directly to the service processor.

NVRAM 214 includes a resource record area 215 which stores pertinent status information received from the service processor firmware 217. The service processor 217 will deconfigure certain resources based upon the information in the resource record area 215. These error status and configuration registers 226 in addition to other functions also provide information to the resource record area 215 of the NVRAM 214. The contents of the memory status register 226 that provide the indication to the service processor firmware 217 of a recoverable error is in a preferred embodiment, a bit to indicate the presence of unrecoverable error and address of the unrecoverable error which is provided by the memory configuration control logic.

A critical portion of the present invention is the deconfiguration area 215 of the NVRAM 214. The purpose of the resource record area 215 is to store information concerning memory array 219 error status and configuration states. The deconfiguration area 215 should be flexible enough to allow modification to existing states and be able to handle the addition of new records. The deconfiguration area 215 and its initialization will be described in more detail herein below.

The resource record area 215 comprises the CPU General Record Format, and the CPU Specific Record Format.

With reference now to FIGS. 3A–3B, FIG. 3A depicts an example of the CPU General Record Format and FIG. 3B depicts an example of the CPU Specific Record Format in accordance with the present invention.

The resource record area 215 is initialized by the service processor firmware 217 as part of the NVRAM 214 initialization process. The service processor firmware 217 initializes the deconfiguration area 215 as follows:

1. one CPU General Format Record
2. n CPU Specific Record Formats, where n=maximum number of CPUs in the system when fully configured Each of the initialization values are described below.

Initialization Values

A. CPU General Record Format (FIG. 3A)
1. Byte 0–1, RL=14+y, where y=maximum number of bytes to hold a CPU FRU location code
2. Byte 2, N=maximum number of CPUs in the system when fully configured
3. Byte 3–30, copy the ASCII value form CPU VPD XC-L2, ZC-PF, ZC-PS, and SC-SB field B. CPU Specific Record Format (FIG. 3B)
1. Byte 0, physical CPU number (OpenPic Interrupt) for this CPU as defined in the Product Functional Spec.
2. Byte 1, CPU ID as defined in PIR or EAR register
3. Byte 2-bit 0=0
4. Byte 2-bit 1–3=0
5. Byte 2-bit 4–7=0, if the CPU is not present, and =1 if the CPU is present
6. Byte 3, the ASCII value from CPU VPD ZC-ER field converted to hex format
7. Byte 4–13, copy the ASCII value from CPU VPD SN field
8. Byte 14–(14+y), the physical/hardware location code for this CPU as defined in the Product Functional Spec With reference now to FIG. 4, a block diagram of a data processing system 400 in which memory components may be deallocated is depicted in accordance with the present invention. Data processing system 400 may be implemented, for example, as data processing system 100 in FIG. 1. Data processing system 400 includes a CPU 412, which has boot firmware 413 therewithin. The CPU 412 is in communication with a nonvolatile device such as a nonvolatile random access memory (NVRAM) 414 which contains information such as serial number and other identifying information within it. The memory 418 includes a memory array 419 which typically comprises a plurality of memory devices and includes a memory controller 422. The memory controller 422 typically includes memory configuration control logic 424, and memory status registers 426 respectively. The controller 422 also provides information to a service processor 416 concerning the status of the memory array 419. The service processor 416 includes service processor firmware 417 and is in communication with NVRAM 414 to provide information thereto.

It is possible that if certain portions of the memory 418 are shut down, the processing system 410 may still operate effectively. Therefore, if a portion of the memory array 418 has soft errors or recoverable errors that are affecting the performance of the processing system 400, the processing system 400 resumes function while deconfiguring those portions of the memory that are causing the repeatable soft errors.

Accordingly, defects are detected during normal computer operations by error detection logic. This detection is utilized during any subsequent boot process by service processor 416 and CPU boot firmware 413 to deallocate the defective memory module. This is accomplished through the use of error status and configuration registers within the memory controller chip 422 and through the use of a resource record area 415 in the nonvolatile device, which provides information directly to the CPU boot firmware 413.

NVRAM 414 includes a resource record area 415 which stores pertinent status information received from the service processor firmware 417. The service processor 417 will deconfigure a memory based upon the information in the resource record area 415. The memory error status registers 426 provides information to the service processor firmware 417 which allows the firmware 417 to store the error status information in the resource record area 415 of the NVRAM 414. The contents of the error status register 426 that provide the indication to the service processor firmware 417 of a recoverable error is in a preferred embodiment, a bit to indicate the presence of an unrecoverable internal error.

An important portion of the present invention is the resource record area 415 of the NVRAM 414. The purpose of the resource record area 415 is to store information concerning each memory error status and configuration states. The resource record area 415 should be flexible enough to allow modification to existing states and be able to handle the addition of new records. The resource record area 415 and its initialization will be described in more detail herein below.

The resource record area 415 comprises the Memory General Record Format, and the Memory Specific Record Format.

Figures 4, 5A:
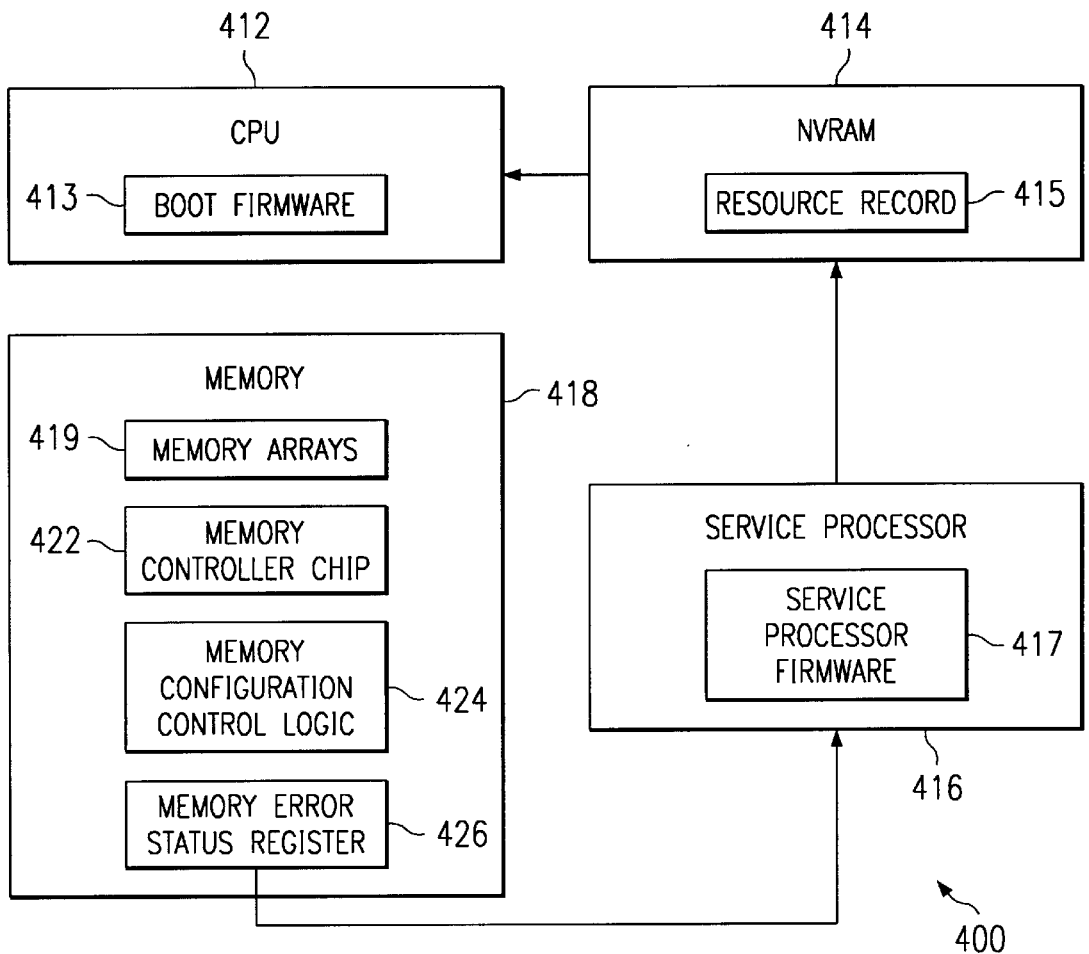
FIG. 4 depicts a block diagram of a data processing system 400 in which memory components may be deallocated in accordance with the present invention.
FIG. 5A depicts an example of the Memory General Record Format in accordance with the present invention.

With reference now to FIGS. 5A–5B, FIG. 5A depicts an example of the Memory General Record Format and FIG. 5B depicts an example of the Memory Specific Record Format.

The resource record area 415 is initialized by the service processor 417 as part of the NVRAM 414 initialization process. The service processor firmware 417 initializes the resource record area 415 as follows:

1. one Memory General Format Record
2. n Memory Specific Record Formats, where n=maximum memory supported by the system Each of the initialization values are described below.
Initialization Values
A. Memory General Record Format (FIG. 5A)
1. Byte 0–1, RL=8+y, where y=maximum number of bytes to hold a memory FRU location code
2. Byte 2, N=maximum number of memory FRUs (DIMM or card) in the system when fully configured B. Memory Specific Record Format (FIG. 5B)
1. Byte 0, memory card slot number or ID
2. Byte 1, memory slot number or ID
3. Byte 2-bit 0=0
4. Byte 2-bit 1–3=0
5. Byte 2-bit 4–7=0, if the FRU is not present, and =1 if the FRU is present
6. Byte 3, the ASCII value from memory VPD field converted to hex format
7. Byte 4–7, copy the value form memory
8. Byte 8–(8+y), the physical/hardware location code for this memory Each CPU and memory component deallocated from use as described above in FIGS. 2–5B, remains deallocated until replaced or reallocated by the processes of the present invention as described below. The deallocated component may need to be reallocated if it suffers from a less severe error than a newly failing component in order to maintain the minimum system requirements to keep the data processing system running. The processes for determining which deallocated resource(s), such as CPUs or memory units, should be recovered occurs during IPL. During IPL, at the end of CPU Repeat Card function/process, resource recovery, if necessary, occurs for processors. Also during IPL, at the end of Memory Repeat Card function/process, resource recover, if necessary, occurs for memory. These processes will be discussed in greater detail below.

Figure 6:
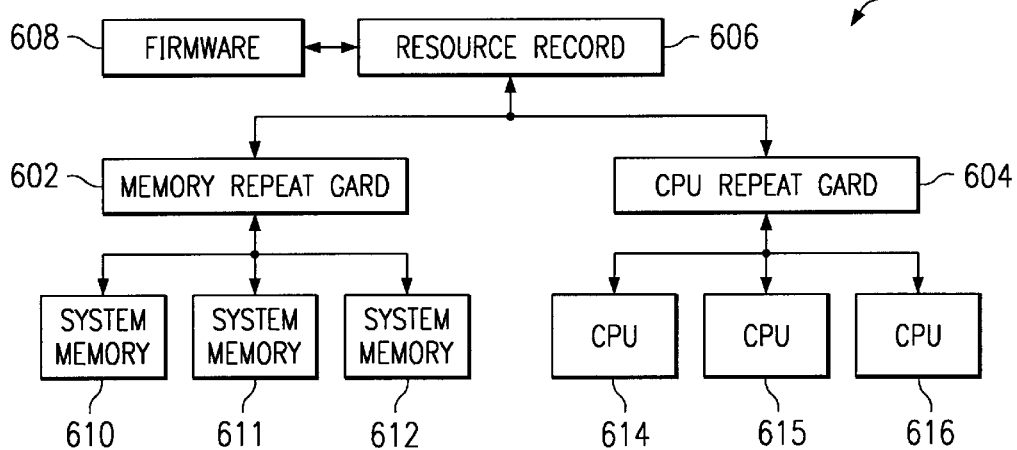
FIG. 6 depicts a block diagram of a system for maintaining optimal system availability via resource recovery in accordance with the present invention.

With reference now to FIG. 6, a block diagram of a system for maintaining optimal system availability via resource recovery during the initial program load (IPL) is depicted in accordance with the present invention. IPL is also sometimes referred to as the boot process. Resource recovery system 600 includes firmware running on a data processing system, such as, for example, data processing system 100 in FIG. 1. Resource recovery system 600 also includes a Memory Repeat Card 602, a CPU Repeat Card 604, and a Resource Record 606. Memory Repeat Card 602 and CPU Repeat Card 604 may be implemented in firmware. Firmware is software stored in a memory chip that holds its content without electrical power, such as, for example, read-only memory (ROM) programmable ROM (PROM), erasable programmable ROM (EPROM), electrically erasable programmable ROM (EEPROM), and non-volatile random access memory (non-volatile RAM) Firmware 608 consults Resource Record 606, which may include both resource record 215 in FIG. 2 and resource record 415 in FIG. 4, when the system is booted to determine which of the resources belonging to the data processing system have been deallocated and should not be utilized.

During IPL Memory Repeat Gard 602 monitors the activity of system memory units 610–612. Also during IPL, CPU Repeat Gard monitors the activity of CPUs 614–616. System memory units 610–612 may be implemented as, for example, one of local memories 160–163 in FIG. 1. CPUs 614–616 may be implemented, for example, as one of processors 101–104 in FIG. 1.

When one of system memory units 610–612 fails, the failure is reported to Memory Repeat Gard 602. Memory Repeat Gard 602 then determines whether minimum system resources will be available if the failing one of system memory units 610–612 is deallocated. Memory Repeat Gard 602 includes an internally stored data structure that contains the minimum system configuration. After deallocating all resources that meet the Memory Repeat Gard 602 deconfiguration requirements, Memory Repeat Gard 602 compares the current system configuration to that of the stored minimum system configuration. If a sufficient number of system memory units 610–612 will be available to meet the minimum system requirements necessary to boot the data processing system, then the none of the previously deallocated system memory units 610–612 is reallocated and reconfigured. Thus, by removing the failed one of system memory units 610–612, the performance of the data processing system is optimized since the data processing system will not attempt to utilize a system resource that does not perform correctly. Memory Repeat Gard 602 then creates an entry in Resource Record 606 indicating the particular one of system memory units 610–612 that failed, the nature and type of the failure, and an indication that the particular failing one of system memory units 610–612 has been deallocated and deconfigured from the data processing system.

CPU Repeat Card 604 monitors the performance of CPUs 614–616. When one of CPUs 614–616 fails, that failure is reported to CPU Repeat Card 604. CPU Repeat Card 604 then determines whether minimum system resources will be available if the failing one of CPUs 614–616 is deallocated. If a sufficient number of CPUs 614–616 will be available to meet the minimum system requirements necessary to boot the data processing system, then the failing one of CPUs 614–616 is deallocated and deconfigured from the system such that the failing one of CPUs 614–616 cannot be accessed by the data processing system. Thus, as before, by removing the failed one of CPUs 614–616, the performance of the data processing system is optimized since the data processing system will not attempt to utilize a system resource that does not perform correctly.

If either Memory Repeat Card 602 or CPU Repeat Card 604 determines, after deallocation of a failed resource, that the current system configuration is less than that of the stored minimum system configuration necessary to boot the data processing system, then the Memory Repeat Card 602 and/or CPU Repeat Card 604 determines a best resource(s) to reallocate to meet the minimum system configuration. Each resource (processor or memory) is represented by its resource record 606, which contains data such as, for example, configuration status and failure status. Failure status includes a numerical value indicating the severity of the failure. By comparing these severity values, Memory Repeat Gard 602 and CPU Repeat Card 604 identify the resource that had suffered from the least severe failure. The deallocated resource that suffered from the least severe failure is then reallocated and reconfigured. The resource suffering from the least severe error may be the last resource deallocated and, if so, that resource is reallocated and the data processing system attempts to run using that last failed resource.

To aid in illustrating the present invention, consider the following example. Suppose that the minimum system requirements for the data processing system call for one system memory to be available. Also, suppose that system memories 611 and 612 have previously failed and have been deallocated. Each of system memories 611–612 will have an entry in resource record 606 indicating that it has been deallocated and the nature of the failure incurred by the respective one of system memories 611–612.

If system memory 610 later suffers a failure, the data processing system cannot function if system memory 610 is deallocated, since it needs at least one system memory to boot. Therefore, Memory Repeat Card 602 cannot merely deallocate system memory 610 and do nothing further. Thus, Memory Repeat Card 602 deallocates system memory 610 and then checks the current system configuration against the minimum system configuration and determines that one system memory needs to be reallocated for use by the data processing system. One of the other system memories 611–612 that have been previously deallocated may have suffered from a less severe error than the error causing the failure in system memory 610 and would, thus, be a better system memory on which to run the data processing system than would be system memory 610. Therefore, Memory Repeat Gard 602 consults Resource Record 606 and analyzes the contents to determine which of system memories 610–612 would provide the best resource on which to run the data processing system.

If the error causing the failure in system memory 612 is less severe than the error causing the failure of system memory 610, then system memory 612 is reallocated and reconfigured for use by the data processing system and system memory 610 is deallocated and deconfigured from use by the data processing system. However, if the errors causing the failures of system memories 611–612 are more severe than the error causing the failure of system memory 610, then Memory Repeat Gard 602 reallocates reconfigures system memory 610 for use by the data processing system.

Those of ordinary skill in the art will appreciate that the components depicted in FIG. 6 may vary. For example, other system resources, such as, for example, input/output adapters and the like, also may be used in addition to the components depicted. A component could then be added for reallocating deallocated ones of the I/O adapters to maintain the minimum I/O resources as well as provide the optimal I/O resources under the circumstances. It should also be noted, that in other embodiments, the failed resource reallocated for use by the data processing system may not be the best available resource from the group of failed resources, -but may merely be a better resource to utilize than the last failing resource or may merely be a better resource to utilize than the worst failed resource. The depicted example is not meant to imply architectural limitations with respect to the present invention.

Figure 7:
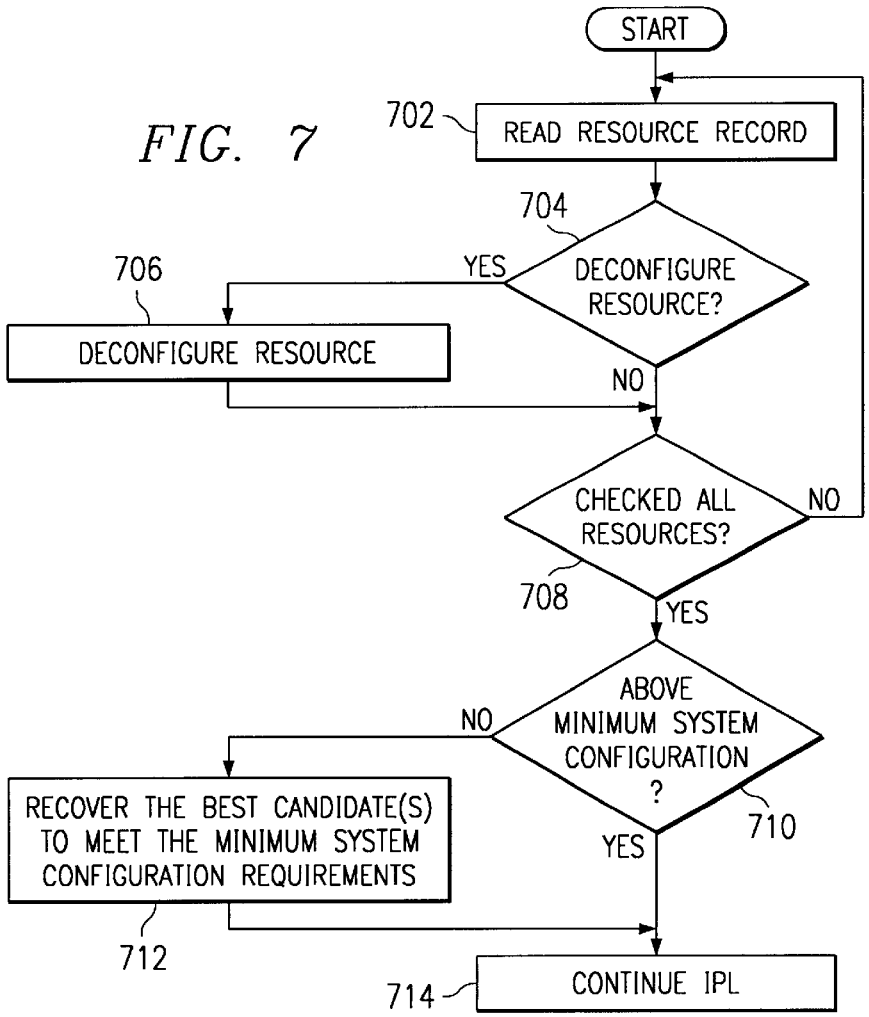
FIG. 7 depicts a flowchart illustrating an exemplary process for reallocating failed resources in accordance with the present invention.

With reference now to FIG. 7, a flowchart illustrating an exemplary process for reallocating failed resources is depicted in accordance with the present invention. A resource recovery component, such as, for example, Memory Repeat Gard 602 or CPU Repeat Gard 604 in FIG. 6, monitors the data processing system checking for system resource failures by reading the resource record (step 702). Contents of the resource record are examined to determine if the resource shouldd be deconfigured (step 704). The resource is deconfigured, if qualified (step 706). If the resource does not qualify, or after deconfiguring the resource if it qualifies, it is determined whether all resources in the resource record have been checked (step 708). If all resources have not been checked, then the next resource record is read (step 702).

If all resources have been checked, then it is determined whether there are sufficient resources available that have not been deconfigured in order to met the minimum system configuration (step 710). If there are sufficient resources available to meet the minimum system configuration, then continue with the initial program load (IPL) (step 714). If there are not sufficient resources available to meet the minimum system configuration, then the best resource candidate or candidates are recovered in order to meet the minimum system configuration requirements (step 712). Once sufficient resources have been recovered to meet the minimum system configuration for IPL, the system continues with IPL (step 714).

Those of ordinary skill in the art will appreciate that the processes depicted in FIG. 7 may vary depending on implementation. More or fewer steps may be utilized than those depicted in FIG. 7 without departing from the scope and spirit of the present invention. Furthermore, some steps may be implemented in differing order than depicted in FIG. 7.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recovering system resources to provide a minimum system configuration, the method comprising:
   determining that a first resource has failed;
   deallocating the first resource;
   responsive to a determination that deallocation of the resource has resulted in less than the minimum system configuration for operation of a data processing system, determining which of a plurality of deallocated resources suffered from a least severe failure; and
   reallocating the one of the plurality of deallocated resources that suffered from the least severe failure.

2. The method as recited in claim 1, wherein the one of the plurality of deallocated resources that suffered from the least severe failure is the first resource.

3. The method as recited in claim 1, wherein the determination of which of a plurality of deallocated resources suffered from a least severe failure comprises consulting a resource record containing items indicating the identity and type of failure of the deallocated resources.

4. The method as recited in claim 1, wherein the resources comprise system memory.

5. The method as recited in claim 1, wherein the resources comprise processing units.

6. The method as recited in claim 1, wherein instructions for implementing the method are contained in firmware.

7. A computer program product in a computer readable media for use in a data processing system for recovering system resources to provide a minimum system configuration, the computer program product comprising:
   first instructions for determining that a first resource has failed;
   second instructions for deallocating the first resources;
   third instructions, responsive to a determination that deallocation of the resource has resulted in less than the minimum system configuration for operation of a data processing system, for determining which of a plurality of deallocated resources suffered from a least severe failure; and
   fourth instructions for reallocating the one of the plurality of deallocated resources that suffered from the least severe failure.

8. The computer program product as recited in claim 7, wherein the one of the plurality of deallocated resources that suffered from the least severe failure is the first resource.

9. The computer program product as recited in claim 7, wherein the determination of which of a plurality of deallocated resources suffered from a least severe failure comprises consulting a resource record containing items indicating the identity and type of failure of the deallocated resources.

10. The computer program product as recited in claim 7, wherein the resources comprise system memory.

11. The computer program product as recited in claim 7, wherein the resources comprise processing units.

12. The computer program product as recited in claim 7, wherein instructions for implementing the computer program product are contained in firmware.

13. A system in a computer readable media for use in a data processing system for recovering system resources to provide a minimum system configuration, the system comprising:
   first means for determining that a first resource has failed;
   second means for deallocating the first resource;
   third instructions, responsive to a determination that deallocation of the resource has resulted in less than the minimum system configuration for operation of a data processing system, for determining which of a plurality of deallocated resources suffered from a least severe failure; and
   fourth means for reallocating the one of the plurality of deallocated resources that suffered from the least severe failure.

14. The system as recited in claim 13, wherein the one of the plurality of deallocated resources that suffered from the least severe failure is the first resource.

15. The system as recited in claim 13, wherein the determination of which of a plurality of deallocated resources suffered from a least severe failure comprises consulting a resource record containing items indicating the identity and type of failure of the deallocated resources.

16. The system as recited in claim 13, wherein the resources comprise system memory.

17. The system as recited in claim 13, wherein the resources comprise processing units.

18. The system as recited in claim 13, wherein means for implementing the system are contained in firmware.

* * * * *

UNITED STATES PATENT AND TRADEMARK OFFICE
CERTIFICATE OF CORRECTION

PATENT NO. : 6,651,182 B1
DATED : November 18, 2003
INVENTOR(S) : Chang et al.

It is certified that error appears in the above-identified patent and that said Letters Patent is hereby corrected as shown below:

<u>Title page,</u>
Item [74], *Attorney, Agent, or Firm*, delete "Stephen K. Loe" and insert -- Stephen R. Loe --.

<u>Column 6,</u>
Line 23, after "Repeat", delete "Card" and insert -- Gard --.
Line 25, after "Memory Repeat" delete "Card" and insert -- Gard --.
Line 36, after "Memory Repeat" delete "Card 602, a CPU Repeat Card" and insert -- Gard 602, a CPU Repeat Gard --.
Lines 37-38, after "Memory Repeat" delete "Card 602 and CPU Repeat Card" and insert -- Gard 602 and CPU Repeat Gard --.

<u>Column 7,</u>
Line 17, after "Repeat" delete "Card" and insert -- Gard --.
Line 19, after "reported to CPU Repeat" delete "Card 604. CPU Repeat Card" and insert -- Gard 604. CPU Repeat Gard --.
Line 32, after "Memory Repeat" delete "Card 602 or CPU Repeat Card" and insert -- Gard 602 or CPU Repeat Gard --.
Lines 36-37, after "Memory Repeat" delete "Card 602 and/or CPU Repeat Card" and insert -- Gard 602 and/or CPU Repeat Gard --.
Line 44, after "CPU Repeat" delete "Card" and insert -- Gard --.
Lines 64 and 66, after "Repeat" delete "Card" and insert -- Gard --.

<u>Column 10,</u>
Line 1, after "first" delete "resources" and insert -- resource --.

Signed and Sealed this

Seventeenth Day of January, 2006

JON W. DUDAS
*Director of the United States Patent and Trademark Office*